(12) United States Patent
Chen et al.

(10) Patent No.: US 8,644,225 B2
(45) Date of Patent: Feb. 4, 2014

(54) METHOD FOR DETERMINING TRANSMISSION CHANNELS FOR A LPG BASED VEHICLE COMMUNICATION NETWORK

(75) Inventors: Wai Chen, Parsippany, NJ (US); Jasmine Chennikara-Varghese, Somerset, NJ (US); Marcus Pang, Manalapan, NJ (US); Ryokichi Onishi, Jersey City, NJ (US); Toshiro Hikita, Tama (JP)

(73) Assignees: Telcordia Technologies, Inc., Piscataway, NJ (US); Toyota Infotechnology Center U.S.A., Inc., Palo Alto, CA (US)

( * ) Notice: Subject to any disclaimer, the term of this patent is extended or adjusted under 35 U.S.C. 154(b) by 1410 days.

(21) Appl. No.: 11/985,965

(22) Filed: Nov. 19, 2007

(65) Prior Publication Data
US 2009/0129323 A1  May 21, 2009

(51) Int. Cl.
  G06F 15/173 (2006.01)
  H04L 12/28 (2006.01)
  H04W 4/00 (2009.01)
  G06F 15/16 (2006.01)
  H04J 1/00 (2006.01)

(52) U.S. Cl.
  USPC .......... 370/329; 370/255; 370/341; 370/400; 709/223; 709/227; 709/235

(58) Field of Classification Search
  USPC ........................................... 370/329
  See application file for complete search history.

(56) References Cited

U.S. PATENT DOCUMENTS

| | | | | |
|---|---|---|---|---|
| 5,715,297 A * | 2/1998 | Wiedeman | ..................... | 455/427 |
| 6,965,568 B1 * | 11/2005 | Larsen | .......................... | 370/238 |
| 7,130,287 B2 * | 10/2006 | Nounin et al. | ................ | 370/332 |
| 7,339,918 B2 * | 3/2008 | Piirainen | ...................... | 370/347 |
| 7,356,389 B2 * | 4/2008 | Holst et al. | ....................... | 701/3 |
| 7,366,611 B2 * | 4/2008 | Sweetapple | .................. | 701/214 |
| 7,382,740 B2 * | 6/2008 | Joshi | ............................. | 370/254 |
| 7,400,605 B2 * | 7/2008 | Palmer et al. | ................. | 370/333 |
| 7,493,127 B2 * | 2/2009 | Morgan et al. | ............. | 455/456.5 |
| 7,519,019 B2 * | 4/2009 | Yoon et al. | .................... | 370/328 |

(Continued)

FOREIGN PATENT DOCUMENTS

EP   1 783 965 A2   5/2007

OTHER PUBLICATIONS

International Search Report, dated Jan. 9, 2009.

(Continued)

Primary Examiner — Melvin H Pollack
(74) Attorney, Agent, or Firm — Philip J. Feig

(57) ABSTRACT

A method for determining a transmission channel for multi-hop transmission of a data packet from a plurality of data channels in an ad-hoc network. The network includes at least one local peer group. Each local peer group has a plurality of moving vehicles as nodes. The method comprises steps of determining available channels for data packet transmission at each node, transmitting a first list of available channels to at least one other node, receiving, from the at least one other node, a second list of available channel for the at least one other node, creating an available channel table including the first and second lists of available channels, selecting a transmitting channel for a data packet based upon information in the available channel table, and advertising the selected channel to the at least one other node.

17 Claims, 12 Drawing Sheets

(56) References Cited

U.S. PATENT DOCUMENTS

| | | | |
|---|---|---|---|
| 7,522,537 B2* | 4/2009 | Joshi | 370/254 |
| 7,526,539 B1* | 4/2009 | Hsu | 709/223 |
| 7,599,346 B2* | 10/2009 | Brommer | 370/346 |
| RE41,132 E* | 2/2010 | Serizawa et al. | 455/509 |
| 7,672,639 B2 | 3/2010 | Vaddiparty et al. | 455/13.1 |
| 7,908,040 B2* | 3/2011 | Howard et al. | 701/1 |
| 2002/0027512 A1* | 3/2002 | Horita et al. | 340/988 |
| 2002/0072963 A1* | 6/2002 | Jonge | 705/13 |
| 2003/0179742 A1 | 9/2003 | Ogier et al. | |
| 2005/0213550 A1* | 9/2005 | Krishnan et al. | 370/338 |
| 2007/0038743 A1 | 2/2007 | Hellhake et al. | |
| 2007/0091839 A1 | 4/2007 | Abdelhamid et al. | |
| 2007/0165587 A1 | 7/2007 | Choi | |
| 2007/0201401 A1 | 8/2007 | Benveniste | |
| 2008/0103649 A1* | 5/2008 | Shen et al. | 701/23 |
| 2008/0228385 A1* | 9/2008 | Geelen | 701/201 |

OTHER PUBLICATIONS

Jain, N. et al "A multichannel CSMA MAC protocol with receiver-based channel selection for multihop wireless networks", Proceedings of the Tenth International Conference on Computer Communications and Networks, Oct. 15, 2001, pp. 432-439.

European Search report, Jul. 22, 2011.

* cited by examiner

FIG. 6

| NODE ID | AVAILABLE CHANNEL LIST | HC FROM GH | HC FROM SENDER (DIRECTION) | FN STATUS |
|---------|------------------------|------------|----------------------------|-----------|
|         |                        |            |                            |           |
|         |                        |            |                            |           |
|         |                        |            |                            |           |
|         |                        |            |                            |           |
|         |                        |            |                            |           |
|         |                        |            |                            |           |

~600

METHOD FOR DETERMINING TRANSMISSION CHANNELS FOR A LPG BASED VEHICLE COMMUNICATION NETWORK

CROSS-REFERENCE TO RELATED APPLICATIONS

The present invention is related to the following commonly-owned, co-pending U.S. patent application Ser. No. 11/585,047 filed Oct. 23, 2006 entitled Method and Communication Device for Routing Unicast and Multicast Messages in an Ad-hoc Wireless Network (the "'047 Application") and U.S. patent application Ser. No. 11/800,849 filed May 8, 2007 entitled Methods for Optimal Multi-channel Assignments in Vehicular Ad-hoc Networks ('the "'849 Application") the entire contents and disclosures of each of which are expressly incorporated by reference herein as if fully set forth herein.

FIELD OF INVENTION

This invention relates to a communication network in a mobile environment. More specifically, the invention relates to a method for determining communication channels for transmitting a communication packet from a sending node to at least one receiving node.

BACKGROUND

Wireless communication has become common in all aspects of life today, whether it be a wireless home or office network, so-called "hotspot" networks at local cafes, fast food chains or hotels, or even citywide implementations of WiFi technologies. The aim of this wireless push in society is to provide accessibility to information and to increase the productivity that society as a whole has enjoyed through the wide acceptance and utilization of computer networks and especially the Internet.

Simply installing wireless antenna on a node and then transmitting uncoordinated communications would result in collision of data, interference and a significant transmission delay. Specifically, by transmitting uncoordinated data, the airwaves would be flooded with a plurality of messages, which would result in a jamming of the radio waves, as the radio bandwidth is limited. As such, the nodes would interfere with each other's transmission and compete with each other for radio bandwidth for transmission. Further, all messages would propagate in all directions without any consideration of a desired transmission direction.

These problems become more apparent in ad-hoc networks and in networks where the nodes are moving, especially if the nodes are moving vehicles that move at high speeds. Grouping of mobile nodes can support more efficient network management among a specific set of nodes. However, the mobility and lack of inherent relationships make a priori configuration of vehicles into groups problematic. Information such as traffic advisories, Amber alerts, weather advisories, etc., need to be relayed quickly to the vehicles, without delay and interference.

Notably, all information that is necessary for setting up safety communications must be exchanged in near real-time among moving vehicles, and vehicles in the groups must configure themselves in near real-time so that safety communication can take place. The mobility of vehicles implies frequent change of neighbors or vehicle groups, and poses difficulties of using support-servers (for mobility, address, name, media session) within vehicle groups. These key differences make existing tactical ad-hoc networking technologies not directly applicable to vehicle groups for safety communications.

The '047 Application describes a method to organize groups of moving vehicles into a local peer group, selecting one moving vehicle as a group header or leader, maintaining the local peer group using the group header, and generating local routing information. The moving vehicles are adapted for uni-cast and multicast routing.

A moving vehicle cannot simultaneously transmit on and receive through the same channel. Prior to data transmission a channel must be selected. The '047 Application describes that the group header can select the channels for the local peer group. In an embodiment, the '047 Application describes that the channels are selected in a channel-alternate forwarding manner. In another embodiment, '047 Application describes that the transmission and reception channels will be assigned in a double channel alternate manner.

However, the method does not account for local channel availability and movement of the nodes.

SUMMARY OF THE INVENTION

Accordingly, disclosed is a method for determining a transmission channel for multi-hop transmission of a data packet from a plurality of data channels in ad-hoc network. The ad-hoc network is comprised of at least one local peer group. Each local peer group has a plurality of moving vehicles as network nodes. The method comprises the steps of determining available channels for data packet transmission at a node, transmitting a list of locally detected available channels to at least one other node, receiving from at least one other node, a second list of locally detected available channels for at least one other node, creating an available channel table include the first and second lists of available channels, selecting a transmitting channel for a data packet based upon information in the available channel table, and advertising the selected channel to at least one other node.

The selected channel is used for unicast and multi-cast message delivery. The transmission channel is selected to maximize a likelihood of reaching at least one destination or the number of hops that the data packet is transmitted.

The method further includes a step of transmitting the available channel table to at least one other node. The available channel table includes for each node a node identifier, a relay capability of the node selected from unicasting and multicasting, the available channels for the node, a hop count from a group header, and a hop count from a node that generated the available channel table.

The method further includes a step of resolving conflict between more than one node within a given area that selects the same selected channel. If more than one channel request message is received by the same node within a preset period of time, the receiving node sends a channel commit message to a node that sent the channel request message with a higher priority.

Every node within a local peer group or one node within the group that is selected can perform channel selection. One node from each local peer group generates a master channel table from all of the available channel tables received from at least one other node in the one node's local peer group. The master channel table is broadcast to at least one other node in the one node's local peer group using a heartbeat control message.

All control information, such as available channel lists and tables, selected channel advertisements, and commitments are broadcast via a dedicated control channel.

At each node local availability is determined by calculating a received signal strength (RSSI) for each authorized data channel, comparing the RSSI to a predetermined threshold value, and adding the data channel to the first list of available channels based upon the comparison.

Each node's available channel list is added to a membership report message or a heartbeat control message for transmission. The membership report message and heartbeat control message are periodically transmitted as part of maintaining the local peer group.

The step of advertising the selected transmission channel includes the sub-steps of transmitting a channel request message to at least one next hop node, receiving a channel commit message, and activating the selected channel after reception of the channel commit message. The next hop node is an intermediary node or a forwarding node between a sending node and at least one receiving node. The channel request message includes the selected channel.

If a channel commit message is not received within a preset period of time, the channel request message is retransmitted after a random period of time. Alternatively, if a channel commit message is not received within a preset period of time, the selecting step is repeated to select a different channel for transmission. Afterwards, the advertising step is repeated for the different channel. Both alternatives can be used in conjunction with each other.

The channel request message is relayed from a sender node to at least one receiving node one hop at a time. The relayed channel request message is modified to include local channel information of the relaying node.

The method further comprises the steps of receiving a channel request message from a node, determining if a channel included in the channel request is available for reception, updating the available channel table by removing the channel, and transmitting a commit message to the node.

The activating step includes the sub-steps of verifying that the selected channel is still available, updating the available channel table by removing the selected channel, recording the selected channel as active, and sending a data packet over the selected channel.

The channel request message is relayed to a next-hop neighboring node. For multicasting the channel request message is only transmitted to a next-hop node that is a forwarding node for a multicast message group.

BRIEF DESCRIPTION OF THE DRAWINGS

These and other features, benefits, and advantages of the present invention will become apparent by reference to the following figures, with like reference numbers referring to like structures across the views, wherein:

FIG. 6 illustrates an exemplary available channel table in accordance with an embodiment of the invention;

DETAILED DESCRIPTION OF THE INVENTION

Definitions

A "Node" is a router that implements the channel determination and selection process or method as specified in the following description. For example, a moving vehicle having a communication device is a node. For the purposes of this application, a node and moving vehicle are interchangeably used.

A "neighbor node" means that there is a direct link between two nodes. A node X is a neighbor node of node Y if node Y can hear node X A "hop" is a number of nodes in which a message is relayed. The hop count for a neighboring node is 1.

In accordance with the invention, nodes or moving vehicles that have been organized into local peer groups (LPG) will exchange information related to channel availability at each node, proactively select channels for transmission from the available channels, and advertise the selected channel. The channels are selected to create a chain between a source (sender) and at least one destination without overlapping or interference in a given area. The same channel can be used for unicasting or multicasting. A routing table determines the route used for both unicasting and multicasting. The routing table is generated based upon information in control packets, such as heartbeat message and a membership report message, which will be described later.

An LPG 1 is dynamically formed from a plurality of nodes in the immediate vicinity. Specifically, a first node broadcasts a radio signal; other nodes within the range of the first node have the ability to receive the radio signal. Since the LPG 1 is formed based on radio coverage, nodes within an LPG 1 can communicate with each other via a single-hop or a multi-hop without a need for any fixed infrastructure.

Figure 1A:
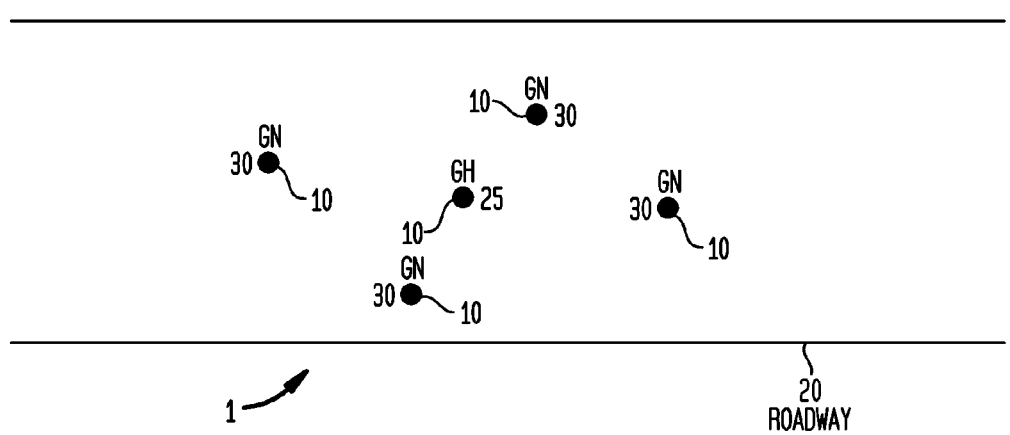
FIG. 1A illustrates an exemplary GH based local peer group.

FIG. 1A illustrates an example of a standard LPG 1. An LPG 1 is formed from two different types of nodes 10: a Group Header (GH) 25 and a Group Node (GN) 30. A GH 25 is a moving device or node 10 within the LPG 1 that is designated to maintain and control the LPG 1 without any ordering of the nodes or any infrastructure. As depicted the LPG 1 is formed by nodes 10 within a roadway system 20.

Each node 10 is capable of operating as a GH 25 or GN 30. As such, each node includes elements or means that allow the node to function or operate as a GH 25 or GN 30, respectively. The formation, maintenance, selection of a GH 25 and control of an LPG 1 is described in the '047 Application which is hereby incorporated by reference.

Figure 1B:
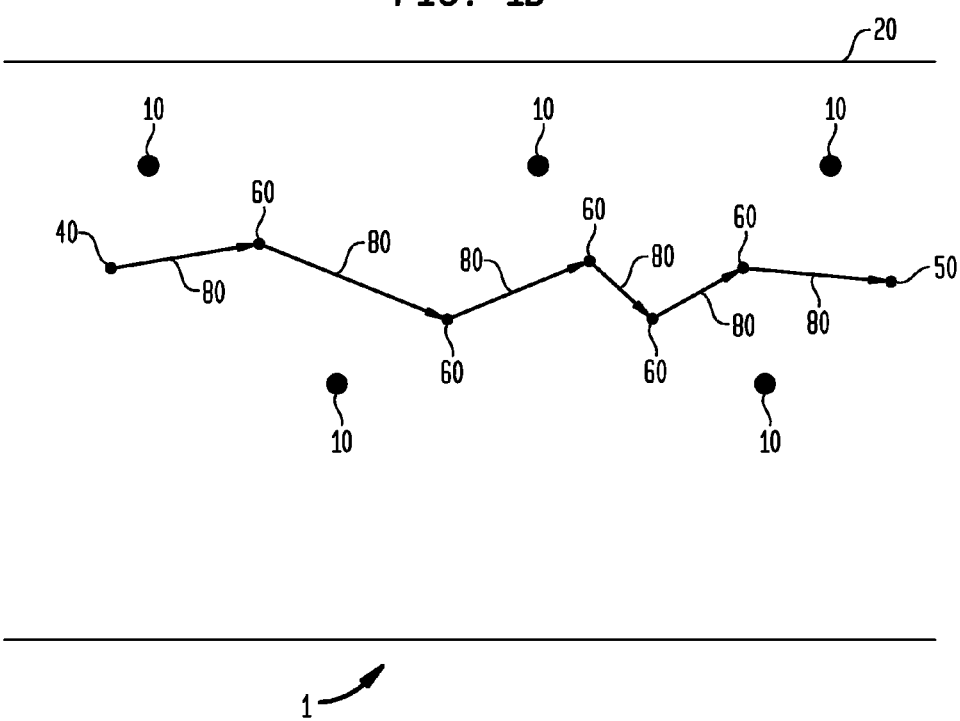
FIG. 1B illustrates an exemplary local peer group as configured for a unicast message.

FIG. 1B illustrates an example of a LPG 1 when it is configured for unicast message communication. As depicted in FIG. 1B, there are 12 nodes. The nodes in FIG. 1B are references as a node 10, a source node 40, a destination node 50 and intermediary nodes 60. One of the nodes 10 is labeled as a source node 40 of the unicast message. Another of the nodes 10 is labeled as a destination node 50. Between the source node 40 and the destination node 50 are intermediary nodes 60. The intermediary nodes 60 are selected based upon local routing information. Other nodes 10 are not a source node 40, intermediary nodes 60 or a destination node 50 and are labeled as nodes 10. The arrows 80 between the source node 40, intermediary node 60, and destination node 50 represent a path of travel for the unicast message from the source node 40 to the destination node 50.

Figure 1C:
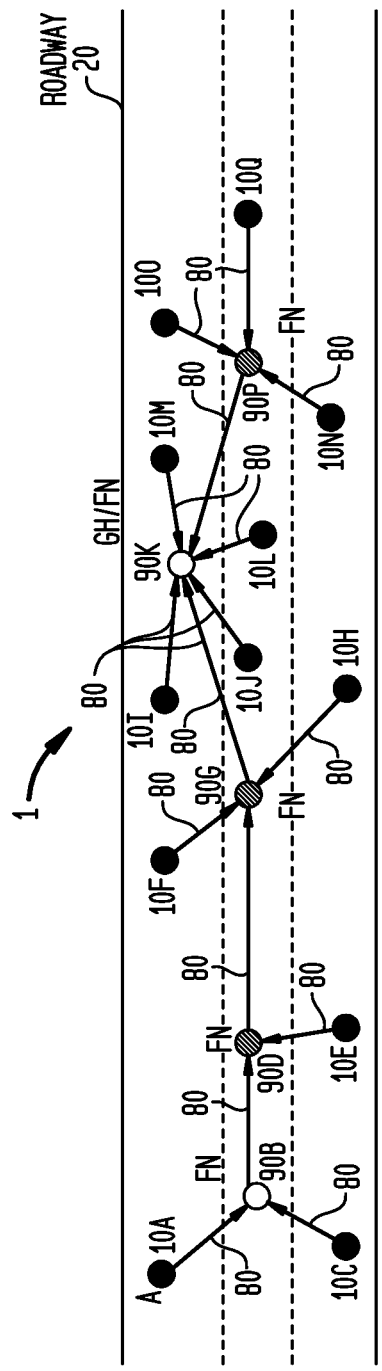
FIG. 1C illustrates an exemplary local peer group as configured for a multicast message.

FIG. 1C illustrates an example of a LPG 1 when it is configured for multicast message communication. As depicted in FIG. 1C, there are five forwarding nodes (FN) labeled as 90 in the LPG 1. For purposes of the example, node 10K is the FN/GH 90. Forwarding nodes 90 are special nodes that are selected to forward multicasting messages for a multicast group. A node 10 becomes a FN 90 if it is used to relay a membership report to a GH 25 (depicted in FIG. 1C as GH/FN 90K). The arrows 80 represent a path of travel for a message being relayed to the GH 25 (depicted in FIG. 1C as GH/FN 90K).

According to this invention channel availability information is added to a heartbeat message and a membership report message that is periodically transmitted by a GH 25 and GN 30, respectively.

Figure 2:
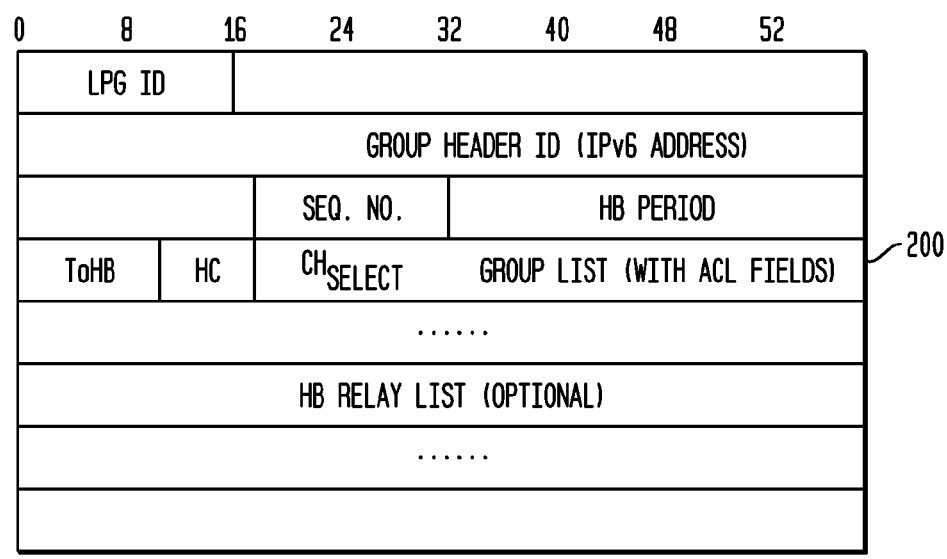
FIG. 2 illustrates an exemplary heartbeat message.

FIG. 2 illustrates an example of a heartbeat message 200 in accordance with the invention. The GH 25 periodically sends out a heartbeat message 200 identifying the LPG 1 and providing information regarding the LPG 1. This period is a fixed interval (T). The value of the interval (T) is selectable based on design or operational needs. The GH 25 also maintains a list of all of the nodes 10 in the LPG 1. This list includes a time stamp of when a node 10 enters the LPG 1 or when GH 25 receives a status update from the node. The list is used for various management and control functions for the LPG 1. For example, the list can be used to track group size, create and update the available channel table, and header resolution. Additionally, this list is periodically broadcast to all of the other nodes 10 in the LPG 1. The LPG heartbeat message 200 is broadcast to all nodes within a radio vicinity of the GH 25.

The heartbeat message 200 will include the identifier of the LPG, the GH identification, a sequence number, and the type of heartbeat message, e.g., heartbeat with complete group list, incremental group list or no group list. In one embodiment, the heartbeat message will include a complete group list in every packet. Using a complete group list is the most accurate way to control routing and maintain a correct list of group members; however, there is a significant amount of bandwidth needed for the heartbeat message with a complete group. In another embodiment, every n-th heartbeat message 200 will include a complete group list. For example, each third heartbeat includes a complete group list. ToHb will indicate the type of heartbeat message. The type of heartbeat message is influenced by the topology change rate of the LPG 1 and frequency of broadcast of the heartbeat. As the topology change rate of an LPG 1 increases, there is a greater need for a complete group list being included in all heartbeat.

The heartbeat message 200 will include the hop count (HC) from the GH. Initially, the HC is set at a predetermined value, e.g., 1. Every time the heartbeat message 200 is relayed by a node 10, the relay node increases the HC value by 1, i.e., HC=HC+1. The HC value can be used to limit the LPG 1 size, to indicate the staleness of the information within the heartbeat message 200 and to control routing of the control packets to reduce overhead. For each LPG 1, there is a maximum hop count for routing, e.g., 10. Once the HC is incremented to the maximum hop count, the control packet, e.g., the heartbeat message 200 will not be relayed.

The use of a maximum hop count, HC and Seq. No. prevents infinite duplications of control packets within the LPG 1. The hop count can also be used for a relay strategy. When a node forwards the heartbeat message it will include its ID information in the message so that next hop nodes know who relayed the heartbeat message 200.

As set forth above, a heartbeat message 200 can also include a Group List. A Group List can include information regarding the members of the LPG 1, such as the number of members in the LPG 1, IP addresses for each number, the hop count from the GH, and a classification.

A classification can be a code that references a relative direction from the GH 25, e.g., uplink, downlink, and peer. A peer classification indicates that a node is within the same wireless coverage area from the GH 25, i.e., all of the peer nodes have the same hop count from the GH. Upstream nodes are determined by the heartbeat. Downstream nodes are determined based upon a membership report (MR) 300 which will be explained later. Upstream transmission represents communication towards the GH 25 and downstream transmission represents communication away from the GH 25. This classification is a relative term. Each GN 30 can classify its neighbors into three different classes. If the membership report of another GN 30 has 1 less hop count (HC) than the HC of the GN 30, the GN 30 is an upstream node. If the HC is the same with its own HC, the GN 30 is a peer. If the HC is 1 greater than its own HC, the GN 30 is a downstream node. The heartbeat message 200 will also include a master available channel table 600 compiled from membership reports from all nodes within the LPG 1. The available channel table 600 includes the available channels for each node 10, the node status and the node identifier. The heartbeat message 200 will also include a transmission channel that the GH 25 selected for itself.

Figure 3:
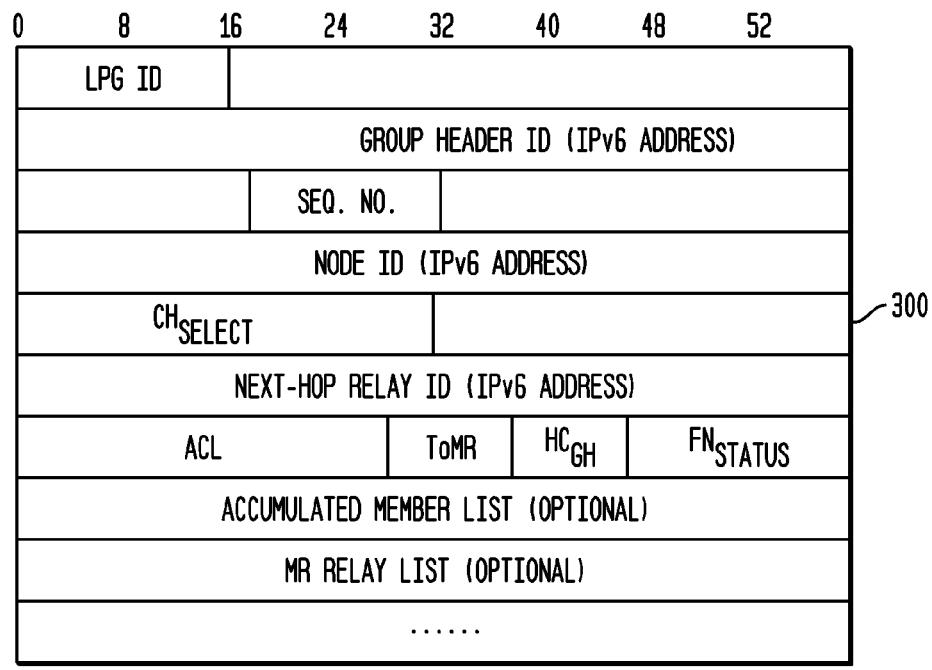
FIG. 3 illustrates an exemplary membership report message.

FIG. 3 illustrates an example of a membership report (MR) 300. An MR 300 is a control packet broadcast by the GN 30 directed to the GH 25. The MR 300 is generated in response to a heartbeat message 200. The MR 300 includes collectable routing information such as a membership list, downstream node identifications, and next hop for downstream nodes. An MR 300 includes some of the same information as the heartbeat message 200: the GID and the Group Header Id. The MR 300 will also include an MR Seq. No. The MR Seq. No. is similar to the Seq. No for the heartbeat message 200 and is used to maintain order of the MR's. The MR. Seq. No. is the MR order for one particular node. Typically, the MR Seq. No. has the same value with the Seq. No. of the heartbeat message 200 that triggered the MR 300.

The Node ID of the originating node is also included in the MR 300, i.e., node that generated the MR 300.

The MR 300 also includes a Next-hop relay ID. The Next-hop relay ID is relay instructions for the MR 300 towards the GH 25. The next hop information is determined directly from the received heartbeat message 200. When a node 10 receives a new or fresh heartbeat message 200, it recovers the previous relaying node's identification from the IP layer and MAC layer before any packet processing. The previous relaying node's identification is stored in memory and used as the Next-hop relay ID for the MR 300. When a node 10 forwards a heartbeat message 200, the node 10 includes its ID in the packet. The receiving next hop node will store this ID when the node receives a new or fresh heartbeat message 200, as the next hop relay ID to reach the GH 25. A new or fresh heartbeat message 200 has a newer sequence number with the lowest HC.

The MR 300 also includes a "Type of MR indicator" ToMR. There are two types of MRs 300: a single member and aggregated multiple member report. A single member MR only includes an MR 300 from the originating node. An aggregated multiple member report includes the MR 300 of more than one node 10. The aggregate report can be used to reduce the overhead and bandwidth needed for control packets. One MR 300 is sent containing multiple MRs.

Additionally, the MR 300 can include a Hop count from the GH ($HC_{GH}$). ($HC_{GH}$) is the HC value from the GH to the originating node of the MR 300. The MR 300 will include an available channel list for the reporting node. Additionally, the MR can include an available channel list for all nodes that relayed the MR 300 towards the GH. Additionally, the MR 300 will include its status or availability for relaying a multicast message, i.e., a forwarding node status.

Each node 10 generates an available channel table 600 (FIG. 6) based upon information from the heartbeat message 200 and MR 300. Specifically, moving vehicles or nodes 10 exchange local information about its own unused or idle channels using heartbeat message 200 and MR 300. Additionally, as the channel use changes, the nodes 10 can transmit channel updates to other nodes. The available channel table 600 is used to identify and update local overlapping interference regions within the LPG 1 and select transmission channels that optimize the transmission between a source, e.g., 40 and destination, e.g., 50.

Figure 4:
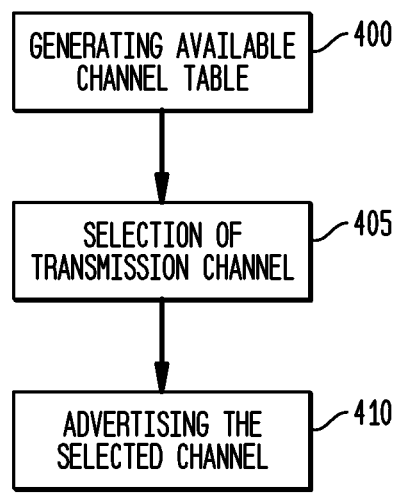
FIG. 4 illustrates a flow chart for the channel determination method in accordance with an embodiment of the invention.

FIG. 4 illustrates a flow chart for the proactive channel assignment method according to the invention. At step 400, an available channel table ("ACT") 600 is generated. The ACT 600 is created from a plurality of available channel lists. Each node 10 within an LPG 1 generates the available channel lists. Each node 10, based upon the ACT 600 determines which channel to pre-select for the next network traffic flow, at step 405. Prior to traffic flow or message transmission, the intermediate nodes, e.g., 60 for the traffic flow and destination nodes, e.g. 50 must be notified that a channel was pre-selected and will be used for active traffic flow, at step 410. For example, in multicast message transmission, the multicast source and FNs 90 advertise channel selected for the multicast message stream at each FN 90. In unicast message transmission, the source 40 and intermediate nodes 60 advertise channels selected for unicast traffic stream at each hop towards the destination node 50.

Figure 5A:
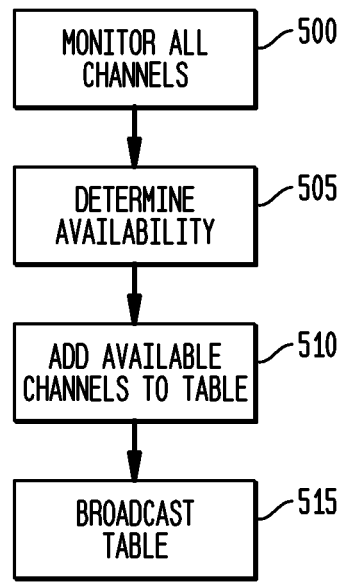
FIGS. 5A and 5B illustrate a flow chart for the generation of the available channel table in accordance with an embodiment of the invention.
Figure 5B:
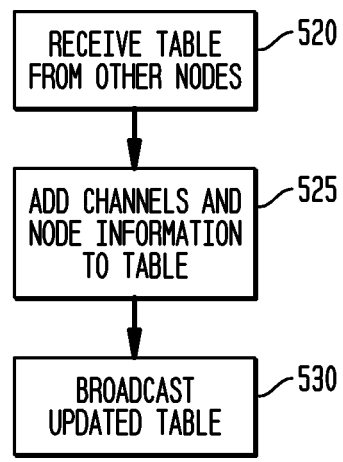

FIGS. 5A and 5B illustrate a flow chart of a method of generating the ACT 600 according to an embodiment of the invention.

At step 500, each node 10 monitors all channels capable of having data transmitted. The number of channels is preset and fixed. For example, in DSRC, there are up to seven possible available channels. In an embodiment, the node 10 will periodically check which channels are available. This period is variable. The MAC layer scans all of the possible available channels to determine any interference and provides a higher layer with information on interference for each possible available channel. At step 505, all available channels are determined. In an embodiment, the channel interference information is used. For example, the received signal strength indicator (RSSI) can be used. The RSSI is calculated and compared with a preset value. If the RSSI for a given channel is below the preset value, then the channel is determined to be available. At step 510, all of the determined available channels are added to the node's local available channel list and ACT 600. A channel identifier, such as frequency or channel number, identifies each channel.

At step 515, the available channel list is transmitted towards the GH 25 by relaying the available channel list through the next hop nodes 10 within the LPG 1. In an embodiment, the available channel list can be added to the MR 300. Alternatively, the available channel list can be separately transmitted.

Each node 10 independently collects available channel information from overheard or relayed heartbeat messages 200 and MRs 300. The overheard or relayed heartbeat messages 200 and MRs 300 are used to determine channel availability for nodes 10 up to k hops away. At step 520, a node 10 receives a heartbeat message 200 or MR 300. At step 525, the node 10 extracts the available channel information from the heartbeat messages 200 and MRs 300, and adds the available channels to its available channel table 600. The updated available channel table 600 is transmitted towards the GH 25, at step 530. The updated available channel table 600 can be appended to the heartbeat message 200 or MR 300.

As described above, the available channel list and table is forwarded to the GH 25. Once the GH 25 receives each local list and table, the GH 25 will create a master ACT, e.g., 600 from the available channel lists of all member nodes and include the master available channel table, e.g., 600 in the next heartbeat message 200.

The heartbeat message 200 and MR 300 can also be used to identify upstream and downstream neighbors which is used to determine a pre-selected channel based upon the flow of the traffic. MRs 300 which pass through a node 10 going to the GH 25 are from downstream neighbors. Received heartbeats 200 with lower hop count to GH are from upstream neighbors. Additionally, for multicasting, upstream and downstream FN 90 are also identified by the heartbeats 200 and MRs 300.

When a node 10 becomes a FN 90 there is a potential that the node 10 already sent out the MR 300 with the available channels. However, once the node 10 becomes a FN 90, it needs to send out a new MR 300 or an updated MR 300 to change its FN status to active. In one embodiment, the new FN 90 will piggyback the status in another node's MR. Alternatively, the FN 90 will transmit a second MR 300 with its new FN status. Accordingly, a node 10 in the same heartbeat cycle or period can transmit two MRs 300.

The ACT 600 is used for both unicasting and multicasting. In one embodiment, the ACT 600 will include information for every destination node, e.g., 50 in the LPG 1. For example, for every next-hop neighbor, the node 10 will include the available channels and hop count from the GH. Additionally, from overheard MRs 300 and heartbeats 200, the node 10 can also include information related to upstream and downstream locations.

In another embodiment, the ACT 600 will include all FNs 90 in the LPG 1. Each node 10 determines its neighboring FN 90 and the number of hops to the neighboring FN 90 using the MRs 300 and heartbeats 200.

In another embodiment, if a node 10 is designated as an FN 90, the node 10 creates separate FN ACT. The FN ACT table includes all FNs 90 in the LPG 1. FIG. 6 illustrates an exemplary format for the ACT 600. As illustrated, the ACT 600 includes the node id for other nodes 10 in the LPG 1 (or FN 90), available channels for the node, the HC from GH and HC from self and direction.

The ACT 600 is used to pre-select channels for transmission. The channels can be selected using one or more method that are described in the '849 Application, which is incorporated by reference. In one embodiment, each node 10 performs the channel selection using one or more methods that are described in the '849 Application. In another embodiment, only the GH 25 performs the channel selection. A channel is selected to maximize the distance traveled from the source, e.g., 40 to the destination, e.g., 50. In an ideal setting, channels for each hop can be selected such that there is a non-overlapping transmission channel for each hop. However, if there is no path for available channels to link the source, e.g., 40, to destination, e.g., 50 the channels are selected to maximize the number of hops or reach the greatest number of FNs 90.

For multicasting, channel selection accounts for multiple destinations. Specifically, the selection accounts for all next-hop FNs 90 and all local multicast receivers that depend on the FN 90 to receive the message. However, if there is no path of available channels to link the source to all of the receivers, the channels are selected to maximize the number of next hop FNs that can receive the message. This will allow that the message can travel along the length of a multicast routing tree.

Figure 7:
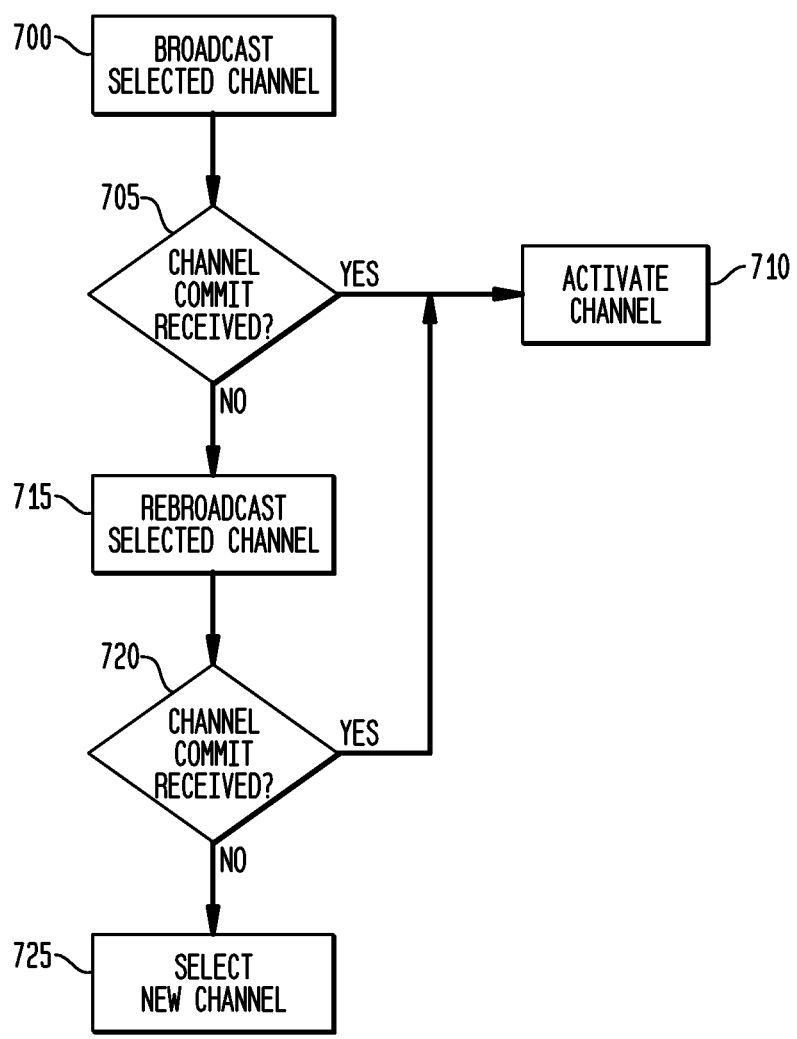
FIG. 7 illustrates a flow chart for the channel advertisement in accordance with an embodiment of the invention.

FIG. 7 illustrates a method of advertising the pre-selected channel according to an embodiment of the invention. Once a channel is selected it remains inactive until a network stream uses it and the channel is advertised, then the channel is activated. Nodes 10 notify its neighboring nodes, and other nodes 10 along the routing path, e.g., intermediary nodes 60, that a channel is going to be activated. The notifying is relayed to other nodes along the routing path. Active channel advertisement is necessary such that a node 10 can determine which channel it will receive a message from a source node, e.g., 40. In addition, a node 10 needs to send an active channel advertisement so the next hop node knows which channel a relay node will relay the message.

An active control message is transmitted on the control channel to notify nodes 10 along the routing path that a selected channel is about to be activated. The control message will specify the channel and the nature of the transmission, i.e., unicast or multicast. The format of the advertisement and the path that the advertisement is routed is different for unicasting or multicasting.

Figure 8:
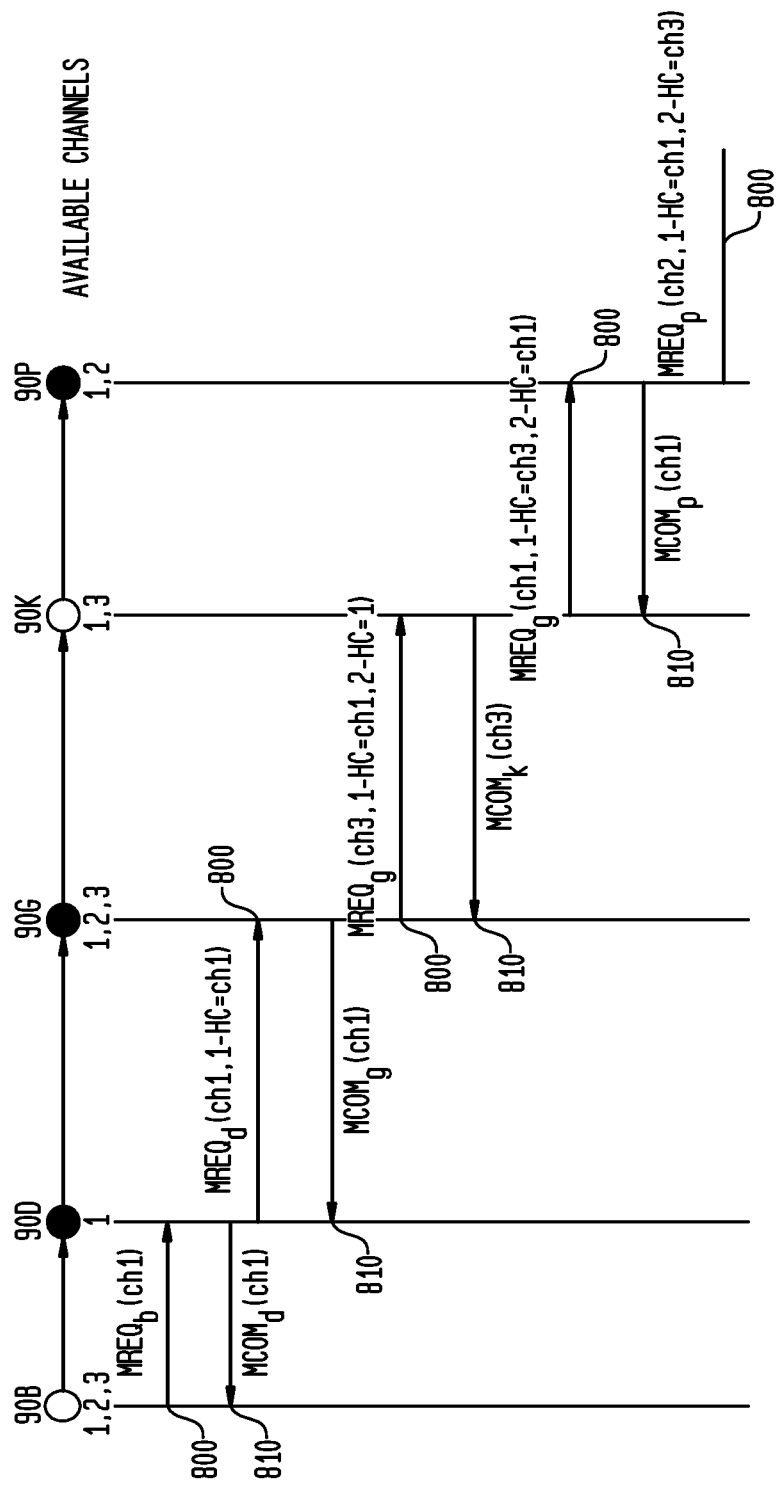
FIG. 8 illustrates an exemplary message flow for the channel advertisement for multicasting in accordance with an embodiment of the invention.

Referring to FIG. 8, for multicasting, the source node advertises the selected channel by transmitting a multicast channel request (MREQ 800) to its local FN 90. If the channel is available, the receiving local FN 90 responds with a multicast channel commit message (MCOM 810), The original MREQ 800 is forwarded by the local FN 90 to the next FN in the chain, i.e., towards at least one multicast destination. At least one next hop FN 90 responds with its own MCOM 810 for the channel request to continue sending traffic along the path. The MREQ 800 is forwarded along the FN path until a maximum hop count for the multicast packet or message is reached. A multicast receiver, i.e., a multicast destination, does not need to respond to a MREQ 800, but will overhear the MREQ 800. Specifically, the multicast receivers listen for MCOM/MREQ 800/810 from the local FN 90 which is designated as the next hop to the GH. When a FN 90 is a leaf FN there is no next hop FN to respond to a MREQ 800. An FN 90 recognizes that it is a leaf FN when its one-hop neighbor FN sent the received MREQ 800 and there is no next-hop FN for a leaf FN.

The MREQ 800 includes at least the current channel selection to be activated. Additionally, the MREQ 800 can include active channels used by FNs 90 up to k-hops away, including the hop count for each channel. Further, the MREQ 800 will include the LPG identifier, the GH identifier, the sequence number, the multicast source identifier, the multicast group identification, and the FN identifier of the relay node. The LPG identifier and the GH identifier are used for identification purposes. The sequence number is used to filter out redundant MREQs 800 or MCOMs 810 that have been previously received and committed. The multicast source identifier is the identification of the source or sending node associated with the multicast traffic stream. The multicast group identification is the identification for the multicast group that the multicast traffic stream pertains. The FN identifier is the identification for the FN 90 which is sending the current MREQ 800.

Upon receipt of the MREQ 800, the next-hop FN or receiving node confirms receipt of the MREQ 800 if the selected channel is available for the node 10. The confirmation or commitment message will be in the form of a MCOM 810 packet. The MCOM 810 packet is similar to the MREQ 800 in that it will include the LPD identifier, the GH identifier, the sequence number, the multicast source identifier, and the multicast group identification. Additionally, the MCOM 810 will include the FN identifier of the node 10 that is broadcasting the MCOM 810 and the active channel identification for the channel that is being committed.

Together the MREQ/MCOM 800/810 are used to announce and commit channel selection at each hop of a multicast routing tree, i.e., along all FNs 90 in the multicast group. The MREQ/MCOM 800/810 are broadcast on the control channel.

FIG. 8 is an example of the MREQ/MCOM message flow for the LPG 1 depicted in FIG. 1C and the FNs 90. For purposes of distinguishing the FNs 90, a letter such as "FNB" identifies the FNs. Additionally, to distinguish the MREQ/MCOM message flow, a subscript is used to identify the node that is transmitting the message. In the example, FNB 90 is the multicast source node. Depicted below each node 10 are the available channels for that node 10. Initially, FN 90B will broadcast its $MREQ_b$ 800 for transmission on channel "1". Node FN 90D will respond with $MCOM_d$ 810 including the channel commit for channel 1. The channel is available. FN 90D will then generate a new $MREQ_d$ 800 including a request for channel "1" for its own transmission and information regarding the channel selected by FN 90B, i.e., ch1, 1-HC is ch1. The $MREQ_d$ 800 is broadcast for receipt by FN 90G. FN 90G responds with $MCOM_g$ 810 including the channel commit for channel 1, since the channel is locally available. FN 90G generates a new $MREQ_g$ 800 including a request for channel "3" for its own transmission and information regarding the channel selected by FNs 90B and 90D, i.e., ch3, 1-HC is ch1 and 2-HC is ch1. The $MREQ_g$ 800 is broadcast for receipt by FN 90K. FN 90K responds with $MCOM_k$ 810 including the channel commit for channel 3, since the channel is locally available. FN 90K generates a new $MREQ_k$ 800 including a request for channel "1" for its own transmission and information regarding the channel selected by FNs 90D and 90G, i.e., ch1, 1-HC is ch3 and 2-HC is ch1. The $MREQ_k$ 800 is broadcast for receipt by FN 90P. FN10P will respond with $MCOM_k$ 810 including the channel commit for channel 3, since the channel is locally available. FN 90P will then generate a new $MREQ_p$ 800 including a request for channel "2" for its own transmission and information regarding the channel selected by FN 90G and 90K, i.e., ch2, 1-HC is ch1 and 2-HC is ch3. However, since FN 90P is a leaf FN, no MCOM 810 is received in response to the MREQ 800. In another embodiment, the channel selection for all FNs 90 can be included in the MREQ 800.

For unicasting, a node 10 will broadcast a unicast message channel request UREQ over the control channel. The UREQ will include at least the current channel selection to be activated. Additionally, the UREQ can include active channels used by intermediary nodes 60 between the source 40 and destination 50 to k-hops away, including the hop count for each channel. Further, the UREQ will include the LPG identifier, the GH identifier, the sequence number, the source identifier, the destination identifier, and identifier of the intermediary node, i.e., identifier of the node sending the UREQ. The LPG identifier and the GH identifier are used for identification purposes. The sequence number is used to filter out redundant UREQs or UREQs that have been previously received and committed. The source identifier is the identification for the source 40 that generated the unicast traffic stream. The destination identifier is the identification for the destination node 50 that is the final destination for the unicast traffic stream.

All intermediary nodes 60 between the source node 40 and destination node 50 receive a UREQ. Additionally, the destination node 50 will also receive the UREQ. Each intermediary node 60 broadcasts a commitment to the pre-selected channel in the form of a UCOM message if the pre-selected channel is locally available. The UCOM packet is similar to the UREQ in that it will include the LPD identifier, the GH identifier, the sequence number, the source identifier, and the destination identifier. Additionally, the UCOM will include the identifier of the node 10 that is broadcasting the UCOM and the active channel identification for the channel that is being committed.

Together the UREQ/UCOM are used to announce and commit channel selection at each intermediary node 60 for the message between the source node 40 and destination node 50. The routing table stored at each node 10 determines the intermediary nodes 60. The destination node 50 will receive a UREQ and broadcast a UCOM to commit the selected channel for the link from the last intermediary node 60 to the destination node 50.

As depicted in FIG. 7, the pre-selected channel is broadcast to a next hop node, at step 700. The node 10 determines if a commitment is received at step 705. If a commitment is received from the neighboring node (at step 705), the pre-selected channel is activated, at step 710. However, if the commitment is not received within a preset period of time, the node 10 rebroadcasts the channel advertisement, step 715. The node 10 determines if a commitment is received to the rebroadcast channel selection, at step 720. If a commitment is received from the neighboring node (at step 720), the pre-selected channel is activated, at step 710. However, if the commitment to the rebroadcast channel selection is not received within a preset period of time, the node 10 selects a new channel, at step 725. The channels can be selected using one or more method that are described in the '849 Application, which is incorporated by reference.

In another embodiment, the node 10 can rebroadcast the original pre-selected channel for a predetermined number of times. Only after the rebroadcast has occurred for the predetermined number of times, will the node 10 select a new channel, at step 725.

Figure 9:
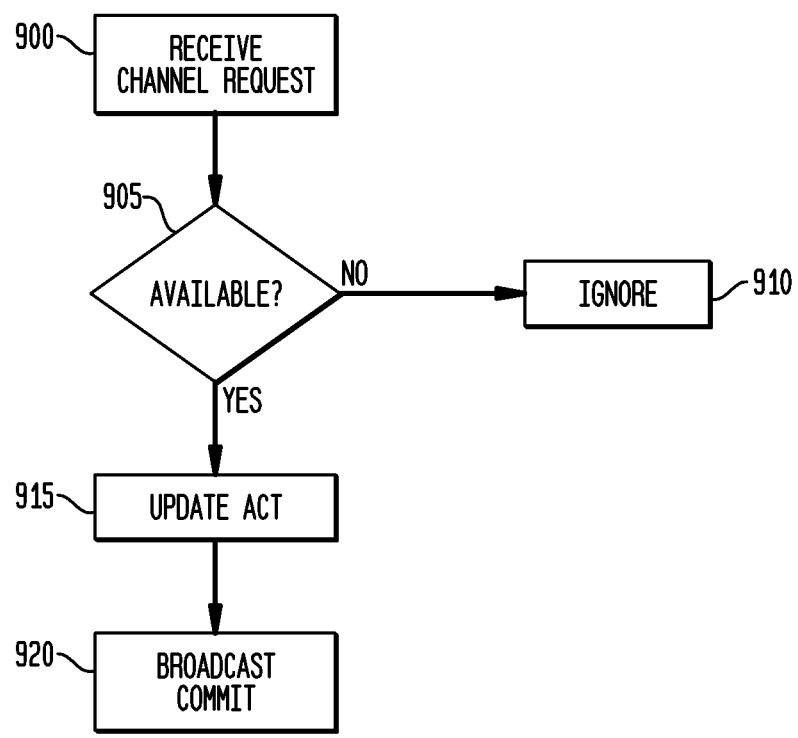
FIG. 9 illustrates a flow chart for channel commitment in accordance with an embodiment of the invention.

FIG. 9 illustrates a method of processing a channel advertisement according to an embodiment of the invention. At step 900, a receiving node, e.g., FN 90 or intermediary node 60, receives a channel request message including a pre-selected channel. At step 905, the receiving node, e.g., FN 90 or intermediary node 60, determines if the pre-selected channel is locally available. Specifically, the receiving node, e.g., FN 90 or intermediary node 60, retrieves the ACT 600 and compares the pre-selected channel with the channels from the ACT 600. If there is no match, the advertisement is ignored at step 910. However, if there is a match, the receiving node, e.g., FN 90 or intermediary node 60, will update the ACT 600 by removing the pre-selected channel from the list, at step 915. The receiving node, e.g., FN 90 or intermediary node 60, will broadcast its commitment to the channel, at step 920. Additionally, the receiving node, e.g., FN 90 or intermediary node 60, updates the pre-selected channel status to active.

Figure 10:
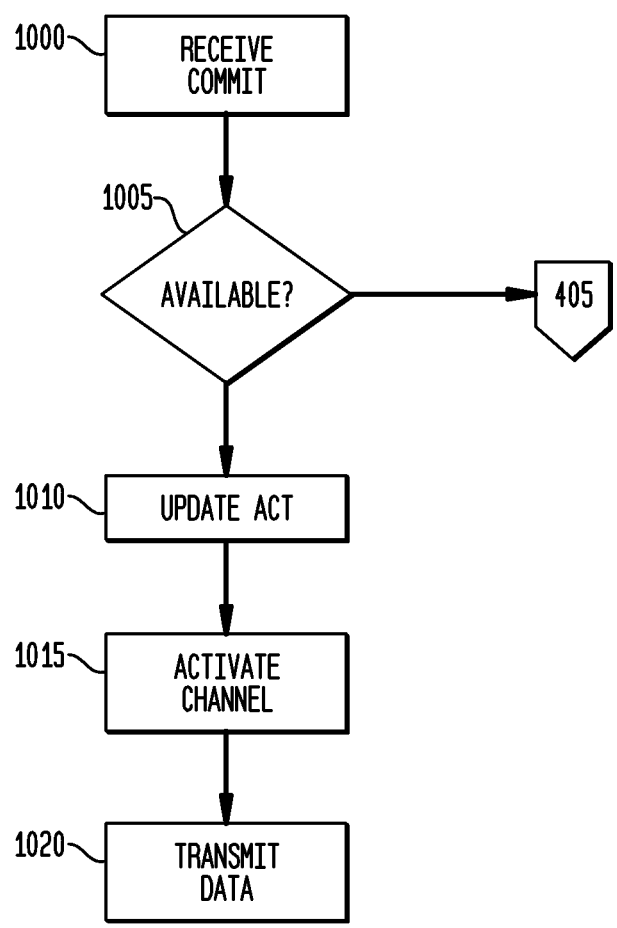
FIG. 10 illustrates a flow chart for channel verification and activation in accordance with an embodiment of the invention.
Figure 11:
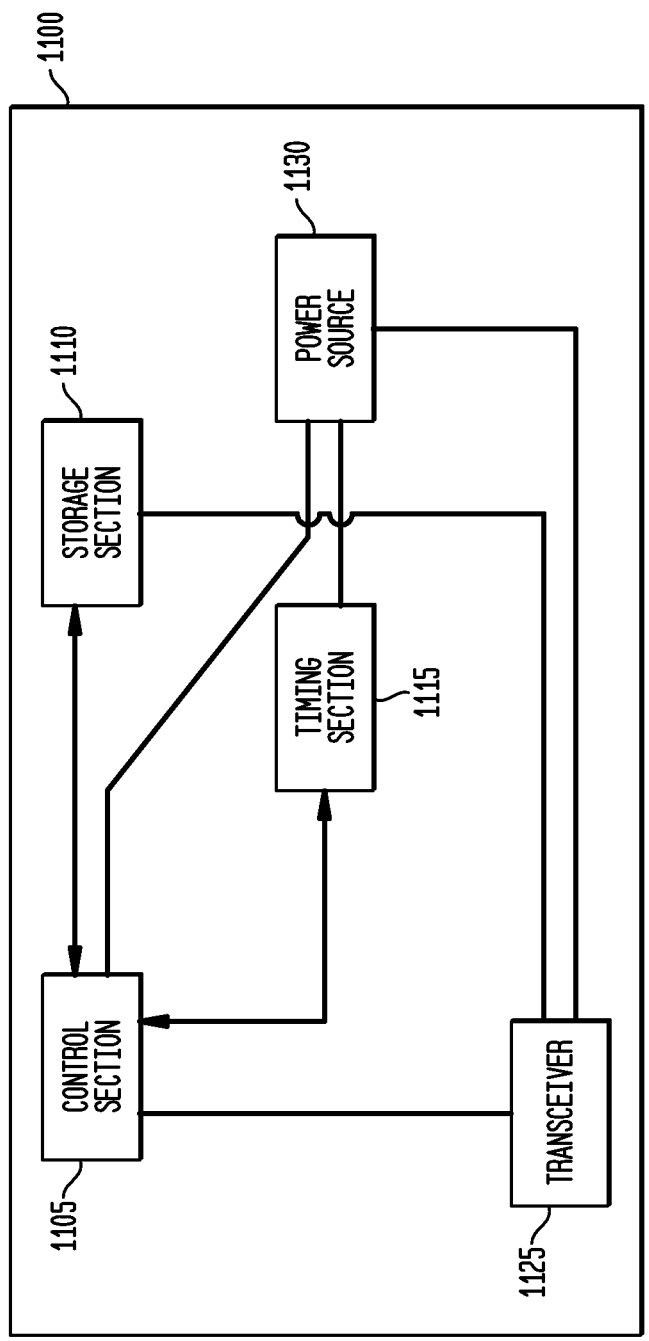
FIG. 11 illustrates a block diagram of an exemplary communication device in accordance with an embodiment of the invention.

FIG. 10 illustrates a process of activating the pre-selected channel. At step 1000, a node 10 receives the commitment message. The node 10 determines if the pre-selected channel is still available, at step 1005. Specifically, the node 10 retrieves the ACT 600 and compares the pre-selected channel with the channels from the ACT 600. If the pre-selected channel is no longer available, i.e., there is no match; a channel is selected again, at step 405. However, if there is a match, the node 10 will update the ACT 600 by removing the pre-selected channel from the list, at step 1010. The pre-selected channel is activated, at step 1015; the node 10 changes the channels status to active for multicast or unicast traffic. The node 10 starts the traffic stream, at step 1020.

In multicast messaging, more than one FN 90 in the same range may send a MREQ 800 simultaneously resulting in a contention for the same channel. In an embodiment, when a plurality of FNs 90 conflict, i.e., send an MREQ 800 for the same channel at the same time, the FN 90 with the higher identifier will receive the MCOM 810 for the channel. In other words, the node 10 with the higher identifier will be given priority for the channel. In another embodiment, each FN 90 that is sending the MREQ 800 at the same time will resend the MREQ 800 after a random delay.

A moving device, node or moving vehicle will include the communications device 100 can be attached to, embedded in or used in combination with the moving vehicle. The communications device 1100 can implement the selection method in accordance with any of the described embodiments of the invention The communications device 1100 includes a computing device or control section 1105, a storage section 1110, a timing section 1115, a transceiver 1125 and a power source 1130. The transceiver 1125 is for providing wireless communication between nodes in a radio coverage range.

The control section 1105 can be any type of controller such as, but not limited to, a microcontroller or a microprocessor. The control section 1105 provides operational control by executing instructions, which have been programmed.

A storage section 1110 is disposed within the communications device 100 and in operational communication with the control section 1105. The storage section 1110 may be memory modules, removable media or a combination of multiple storage devices, etc., and is configured to store the processor-executable instructions necessary for the performance of the methods and protocols described herein.

Further, at least one timing section 1115 is provided either as a separate component or in the control section 1105. As depicted, the timing section 1115 is a separate component. The timing section 1115 provides the time interval tracking necessary for each of the timers referred to in the described embodiments.

A power source 1130 is electrically connected to all the components of the communications device 1100 for providing operational power to the components as necessary. The communications device 1100 further includes an internal clock (not shown) that maintains a clock for the device and is used as the timestamp for all messages.

The processor-executable instructions for performing the described embodiments may be embedded in the storage section 1110 in a form such as an EPROM, Flash memory or other such non-volatile storage. Additionally, the processor-executable instructions may be stored on a computer readable media such as an optical or magnetic medium, or may be downloadable over a network (e.g., Internet). Preferably, a user, as necessary, can periodically update the processor-executable instructions in order to provide additional enhancements to the system as they become available.

Each communications device 1100 is assigned a unique identifier to facilitate the transmission and reception of messages over the ad-hoc network. The unique identifier can be any number that is uniquely assigned to the communications device 1100 so that no device within a specific area has the same unique identifier. This identifier must be assigned quickly to support immediate communication, if necessary. The unique identifier can be any unique number or address that facilitates communication, such as a MAC address, VIN number or IP address, and this identifier is used as the node's identifier. Any moving vehicle with the communications device 100 can be a node of the ad-hoc network.

The invention has been described herein with reference to a particular exemplary embodiment. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method for determining a transmission channel for multi-hop transmission of a data packet from a plurality of data channels in ad-hoc network, the ad-hoc network comprising at least one local peer group, the local peer group having a plurality of moving vehicle as network nodes, the method comprising the steps of:
   determining available channels for next-hop neighbor routing for data packet transmission at a node by scanning MAC layer channels;
   transmitting a first list of available non-conflicting wireless channels or frequencies based on channel usage to at least one other node wherein said transmitting step includes adding the first list of available channels to a membership report message or a heartbeat control message;
   receiving, from the at least one other node, a second list of available channels for the at least one other node;
   creating by a group header an available channel table including the first and second lists of available channels;
   selecting by each node or by a group header a transmitting channel for a data packet based upon information in the available channel table wherein the first list, second list, and the selected channel is transmitted on a dedicated control channel; and
   advertising by each node the selected channel to the at least one other node.

2. The method for determining a transmission channel according to claim 1, wherein for each of the plurality of data channels, the determining step includes the sub-steps of:
   calculating a received signal strength (RSSI) for the data channel;
   comparing the RSSI to a predetermined threshold value; and
   adding the data channel to the first list of available channels based upon the comparison.

3. The method for determining a transmission channel according to claim 1, wherein the selected channel is used for unicast and multicast message delivery.

4. The method for determining a transmission channel according to claim 1, further including a step of transmitting the available channel table to the at least one other node.

5. The method for determining a transmission channel according to claim 4, wherein one node from each local peer group generates a master channel table from all of the available channel tables received from the at least one other node in the one node's local peer group and transmits the master channel table to the at least one other node in the one node's local peer group using a heartbeat control message.

6. The method for determining a transmission channel according to claim 1, wherein the available channel table includes for each node, a node identifier, a relay capability of the node selected from unicasting and multicasting, the available channels for the node, a hop count from a group header and a hop count from a node that generated the available channel table.

7. The method for determining a transmission channel according to claim 1, wherein the transmission channel is selected to maximize a likelihood of reaching at least one destination or the number of hops that the data packet is transmitted.

8. The method for determining a transmission channel according to claim 1, wherein said step of advertising the selected channel includes the sub-steps of:
   transmitting a channel request message to at least one next hop node, the at least one next hop node being an intermediary node or a multicast forwarding node between a sender node and at least one receiving node, the channel request message including the selected channel;
   receiving a channel commit message from at least one next hop node; and
   activating the selected channel after reception of the channel commit message.

9. The method for determining a transmission channel according to claim 8, wherein if a channel commit message is not received within a preset period of time, said selecting step is repeated to select a different transmitting channel.

10. The method for determining a transmission channel according to claim 9, wherein said advertising step is repeated for the different channel.

11. The method for determining a transmission channel according to claim 8, wherein if a channel commit message is not received within a preset period of time, the channel request message is retransmitted after a random period of time.

12. The method for determining a transmission channel according to claim 8, wherein the channel request message is relayed from a sender node to at least one receiving node one hop at a time, the relayed channel request message is modified to include local channel information of a relaying node.

13. The method for determining a transmission channel according to claim 8, further comprising the steps of:
   receiving channel request message from a node from at least one previous hop node;
   determining if a channel included in the channel request message is available for reception;
   updating the available channel table by removing the included channel; and
   transmitting a commit message to the node.

14. The method for determining a transmission channel according to claim 8, wherein the activating step includes the sub-steps of:
   verifying that the selected channel is still available;
   updating the available channel table by removing the selected channel;
   recording the selected channel as active; and
   sending a data packet over the selected channel.

15. The method for determining a transmission channel according to claim 13, further comprising the step of:
   relaying the channel request message to a next-hop neighboring node.

16. The method for determining a transmission channel according to claim 1, further including the step of:

resolving conflict between more than one nodes within a given area that selects the same selected channel.

17. The method for determining a transmission channel according to claim 8, wherein the channel request message is only transmitted to a next-hop node that is a forwarding node for a multicast message group.

* * * * *